United States Patent
FrantzDale et al.

(10) Patent No.: US 11,919,228 B2
(45) Date of Patent: Mar. 5, 2024

(54) TECHNIQUES FOR IMPROVED ADDITIVE FABRICATION ON A FILM SURFACE AND RELATED SYSTEMS AND METHODS

(71) Applicant: Formlabs, Inc., Somerville, MA (US)

(72) Inventors: Benjamin FrantzDale, Harvard, MA (US); Shane Wighton, Raleigh, NC (US)

(73) Assignee: Formlabs, Inc., Somerville, MA (US)

(*) Notice: Subject to any disclaimer, the term of this patent is extended or adjusted under 35 U.S.C. 154(b) by 0 days.

(21) Appl. No.: 17/557,826

(22) Filed: Dec. 21, 2021

(65) Prior Publication Data

US 2022/0193987 A1 Jun. 23, 2022

Related U.S. Application Data

(60) Provisional application No. 63/129,813, filed on Dec. 23, 2020.

(51) Int. Cl.
| | | |
|---|---|---|
| *B29C 64/124* | (2017.01) | |
| *B29C 64/236* | (2017.01) | |
| *B29C 64/245* | (2017.01) | |
| *B29C 64/264* | (2017.01) | |
| *B29C 64/393* | (2017.01) | |

(Continued)

(52) U.S. Cl.
CPC ......... *B29C 64/124* (2017.08); *B29C 64/236* (2017.08); *B29C 64/245* (2017.08); *B29C 64/264* (2017.08); *B29C 64/393* (2017.08); *B33Y 10/00* (2014.12); *B33Y 30/00* (2014.12); *B33Y 50/02* (2014.12)

(58) Field of Classification Search
CPC .... B29C 64/124; B29C 64/129; B29C 64/135
See application file for complete search history.

(56) References Cited

U.S. PATENT DOCUMENTS

5,139,711 A * 8/1992 Nakamura ............ B29C 64/135
250/492.1
8,040,530 B2 10/2011 Cooper
(Continued)

FOREIGN PATENT DOCUMENTS

| NL | 2018484 B1 | 1/2018 |
|---|---|---|
| WO | WO 2017/108762 A1 | 6/2017 |

OTHER PUBLICATIONS

Extended European Search Report dated Jul. 9, 2021 in connection with European Application No. 18900224.9.
(Continued)

*Primary Examiner* — Joseph S Del Sole
*Assistant Examiner* — Ariella Machness
(74) *Attorney, Agent, or Firm* — Wolf, Greenfield & Sacks, P.C.

(57) ABSTRACT

According to some aspects, techniques are provided to mitigate challenges with additive fabrication devices that utilize a film. These techniques include: improvements to an additive fabrication device build platform to more evenly apply forces onto the film; techniques for inhibiting adhesion between a pair of films and for removing dirt or dust therein; techniques for detecting and/or mitigating the effects of scratches or dust on films; and techniques for detecting film punctures, detecting an imminent film puncture, and/or reducing the impact on the device when punctures occur.

11 Claims, 14 Drawing Sheets

(51) Int. Cl.
  B33Y 10/00    (2015.01)
  B33Y 30/00    (2015.01)
  B33Y 50/02    (2015.01)

(56) References Cited

U.S. PATENT DOCUMENTS

| | | |
|---|---|---|
| 10,316,213 B1 | 6/2019 | Arndt et al. |
| 10,611,093 B2 | 4/2020 | FrantzDale et al. |
| 11,186,044 B2 | 11/2021 | FrantzDale et al. |
| 2002/0104973 A1 | 8/2002 | Kerekes |
| 2006/0111807 A1 | 5/2006 | Gothait et al. |
| 2012/0100031 A1 | 4/2012 | Ljungblad |
| 2013/0292862 A1 | 11/2013 | Joyce |
| 2014/0242717 A1 | 8/2014 | Rochette et al. |
| 2015/0004045 A1 | 1/2015 | Ljungblad |
| 2015/0034007 A1 | 2/2015 | Fischer et al. |
| 2015/0064298 A1 | 3/2015 | Syao |
| 2015/0145171 A1 | 5/2015 | Walker et al. |
| 2016/0023403 A1 | 1/2016 | Ramos et al. |
| 2016/0046080 A1 | 2/2016 | Thomas et al. |
| 2016/0054115 A1 | 2/2016 | Snis |
| 2016/0136896 A1 | 5/2016 | Wighton |
| 2016/0211116 A1 | 7/2016 | Lock |
| 2017/0036398 A1 | 2/2017 | Gumennik et al. |
| 2017/0057174 A1 | 3/2017 | Megretski et al. |
| 2017/0197363 A1 | 7/2017 | Frantzdale |
| 2017/0210072 A1* | 7/2017 | Rodriguez ............... G02B 1/12 |
| 2017/0217103 A1 | 8/2017 | Babaei et al. |
| 2017/0227418 A1 | 8/2017 | Snis |
| 2017/0239752 A1 | 8/2017 | Buller et al. |
| 2017/0355147 A1 | 12/2017 | Buller et al. |
| 2017/0368747 A1 | 12/2017 | Nolet et al. |
| 2019/0145907 A1 | 5/2019 | Van Mechelen et al. |
| 2019/0210289 A1 | 7/2019 | FrantzDale et al. |
| 2019/0369566 A1* | 12/2019 | Lobovsky ............. B29C 64/124 |
| 2020/0033270 A1* | 1/2020 | Wynne .................. B33Y 10/00 |
| 2020/0070411 A1* | 3/2020 | Chou .................. G03F 7/70416 |
| 2020/0215762 A1 | 7/2020 | FrantzDale et al. |
| 2020/0282657 A1 | 9/2020 | Wighton et al. |
| 2020/0316869 A1* | 10/2020 | Moldave ............... B33Y 30/00 |
| 2021/0031459 A1* | 2/2021 | Jessen .................... B29C 64/30 |

OTHER PUBLICATIONS

International Preliminary Report on Patentability for International Application No. PCT/US2018/12927 dated Jul. 23, 2020.
International Preliminary Report on Patentability dated Sep. 23, 2021 for International Application No. PCT/US2020/021409.
International Search Report and Written Opinion for International Application No. PCT/US2018/12927 dated Mar. 29, 2018.
International Search Report and Written Opinion for International Application No. PCT/US2020/021409, dated Jun. 23, 2020.
Xie et al., LIPS: A Light Intensity Based Positioning System for Indoor Environments. Mar. 7, 2014. 14 pages.
U.S. Appl. No. 16/811,567, filed Mar. 6, 2020, Wighton et al.
EP 18900224.9, Jul. 9, 2021, Extended European Search Report.
PCT/US2018/12927, Mar. 29, 2018, International Search Report and Written Opinion.
PCT/US2018/12927, Jul. 23, 2020, International Preliminary Report on Patentability.
PCT/US2020/021409, Jun. 23, 2020, International Search Report and Written Opinion.
PCT/US2020/021409, Sep. 23, 2021, International Preliminary Report on Patentability.

* cited by examiner

600 ⤴

601 ⤴

601 ⤴

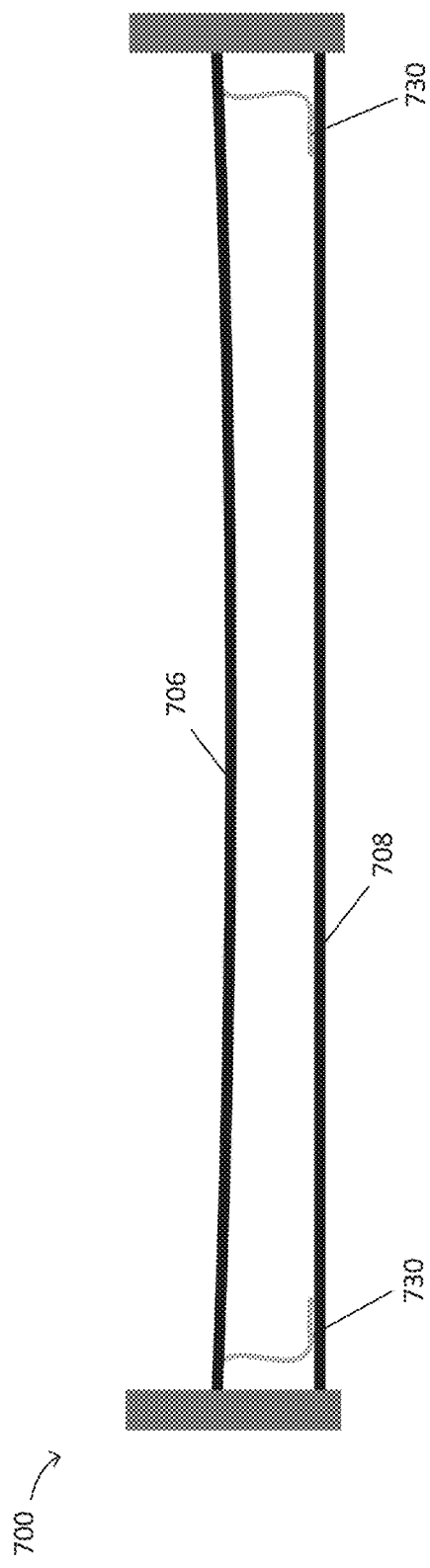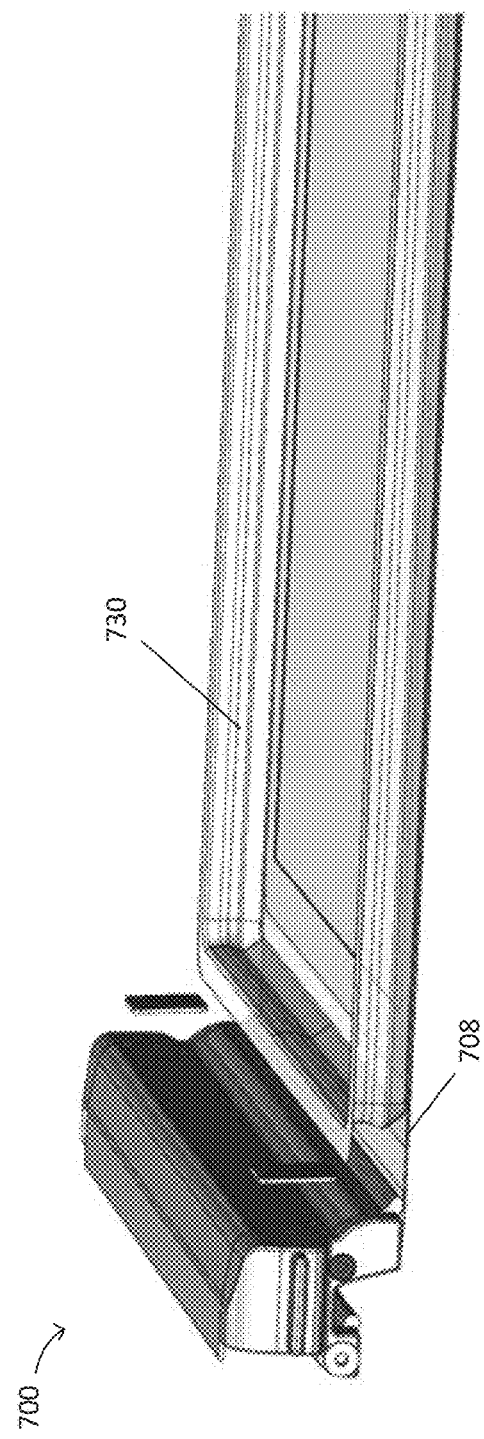

TECHNIQUES FOR IMPROVED ADDITIVE FABRICATION ON A FILM SURFACE AND RELATED SYSTEMS AND METHODS

CROSS-REFERENCE TO RELATED APPLICATIONS

The present application claims the benefit under 35 U.S.C. § 119(e) of U.S. Provisional Patent Application No. 63/129,813, filed Dec. 23, 2020, titled "Techniques for Improved Additive Fabrication on a Film Surface and Related Systems and Methods," which is hereby incorporated by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden, change physical properties, and adhere to previously cured layers or the bottom surface of the build platform. In such techniques as stereolithography, the object is formed by moving an area of incident actinic radiation across the layer of liquid resin to complete the cross section of the object being formed. An area of incident actinic radiation could be caused by any light source(s), such as by a laser.

SUMMARY

According to some aspects, a method is provided of detecting a contaminated region of a film in an additive fabrication device, the method comprising emitting light from a light source included in a movable stage, wherein the movable stage is configured to move in a first direction with respect to the additive fabrication device, directing the emitted light by an optical scanning device included in the movable stage to a plurality of locations on a film of a liquid container, wherein the film corresponds to a curing plane for the additive fabrication device, detecting, by a light sensor, different intensities of light reflected from the film for each of the plurality of locations on the film, detecting one or more contaminants on the film by comparing the different intensities of the reflected light from the film, and in response to detecting the one or more contaminants on the film, calculating respective locations of the one or more contaminants on the film.

According to some aspects, an additive fabrication device is provided, comprising a build platform, a light processing unit configured to move in a first direction with respect to the additive fabrication device, the light processing unit including a optical scanning device, a light source, and a light sensor, a container including a film corresponding to a curing plane for the additive fabrication device, and one or more processors configured to operate the light source to emit light, operate the optical scanning device to direct the emitted light to a plurality of locations on the film, operate the light sensor to detect different intensities of light reflected from the film for each of the plurality of locations on the film, detect one or more contaminants on the film by comparing the different intensities of the reflected light from the film, and in response to detecting the one or more contaminants on the film, calculate respective locations of the one or more contaminants on the film.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 7A-7B depict a container of an additive fabrication device that includes two films and a skirt, according to some embodiments;

DETAILED DESCRIPTION

Figure 1A:
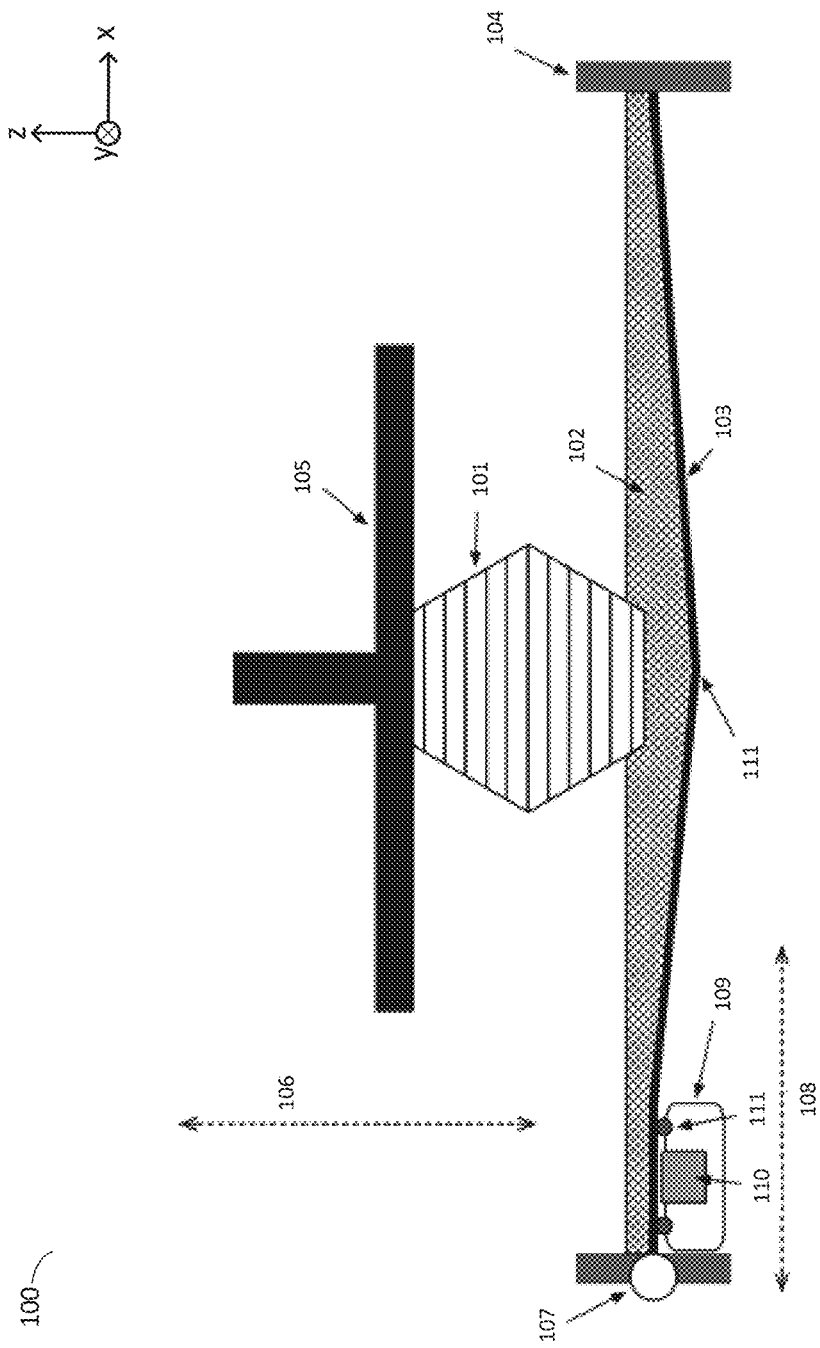
FIGS. 1A-1D illustrate a schematic view of a stereolithographic device that forms a plurality of layers of a part, according to some embodiments.

As discussed above, in additive fabrication a plurality of layers of material may be formed on a build platform. In some cases, one or more of the layers may be formed so as to be in contact with a surface other than another layer or the build platform. For example, stereolithographic techniques may form a layer of resin so as to be in contact with an additional surface such as a container in which the liquid resin is located. In order to form additional layers of the part, any bonding that occurs between the floor of the container and the layer must be broken.

Techniques for reducing the strength of the bond between a part and a surface may include inhibiting the curing process or providing a highly smooth surface on the inside of a container. In many use cases, however, at least some force must be applied to remove a cured resin layer from the container. Multiple problems may arise, however, due to the application of force during the above-described processes. In some use cases, the separation process may apply a force to and/or through the part itself. A force applied to the part may, in some cases, cause deformation or mechanical failure of the part itself. In some cases, other elements of the additive fabrication, such as a film or layer of the container, may be damaged.

In some cases, a stereolithographic device may comprise a container that includes a thin film as an interior surface. In such cases, the use of a film may lower the forces needed to separate the part from the container. To further describe such an approach, an illustrative stereolithographic device and stages of its operation are depicted in FIGS. 1A-1D, according to some embodiments. As shown in the example of FIGS. 1A-1D, stereolithographic device 100 includes a build platform 105 that is configured to adjust its position towards and away from container 104 along an axis 106, referred to herein as the Z axis. The build platform 105 may support a part 101 being formed by the stereolithographic process.

In the example of FIGS. 1A-1D, the container 104 may contain a volume of photopolymer resin 102 and comprise a bottom surface formed by a thin, flexible and/or elastic film 103, substantially transparent to actinic radiation 115. The film 103 may be held under tension by a tensioning device 107. An optics module 109 may be moved along axis 108, referred to herein as the X axis, such that roller elements 111 are in contact with the lower surface of the film 103. The optics module 109 comprises an exposure source 110 of actinic radiation 115 which selectively emits actinic radiation along its length (i.e., the axis running orthogonally to both axis 106 and 108, referred to herein as the Y axis). The optics module 109 further comprises roller elements 111 which are mounted to the top side of the optics module 109 opposing the bottom of the film 103.

In some embodiments, the film 103 may comprise any highly flexible and/or non-reactive material, such as Teflon® (or other fluoropolymer or polytetrafluoroethylene-based material, such as fluorinated ethylene propylene). The sides of the container 104 may be comprised of a more rigid material, such as an acrylic plastic, or may alternatively may be formed of a flexible or compliant material.

According to some embodiments, the stereolithographic device 100 may be operated to fabricate an object, or part, 101 by selectively solidifying layers of photopolymer resin 102 onto build platform 105 by exposing the photopolymer resin 102 to a source 110 of actinic radiation 115. In particular, as shown in FIG. 1A, the build platform 105 may be moved along axis 106 to place the bottom of the build platform 105 or most recently formed layer of the part 101 in close proximity to the bottom plane of the container 104 and the film 103. As the bottom film 103 typically has a certain degree of flexibility and/or elasticity, the weight of the photopolymer resin 102 and/or downwards pressure from the motion of the build platform 106 and part 101 may cause the film 103 to form a "sag", or other form of depression.

Figure 1B:
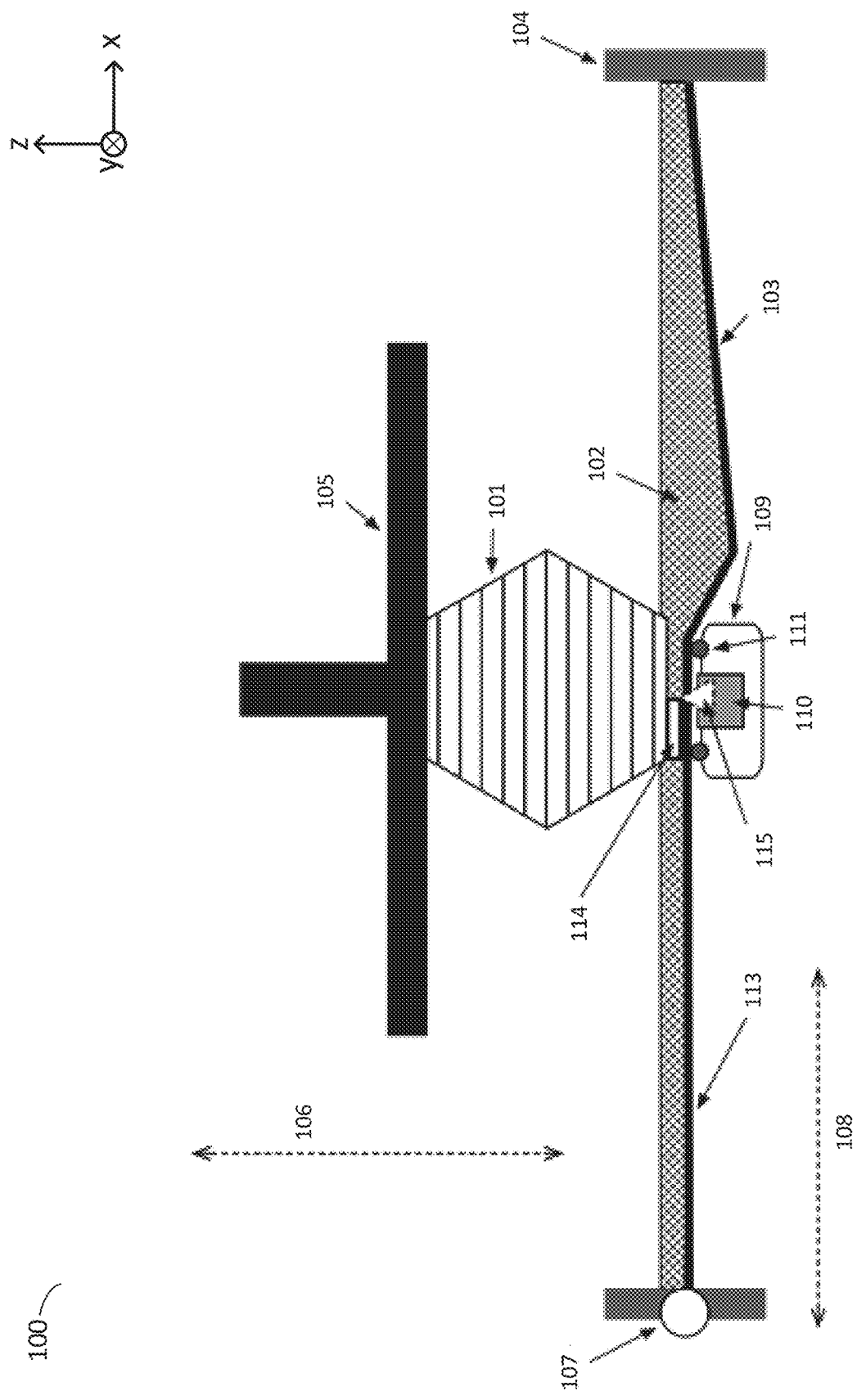
Figure 1C:
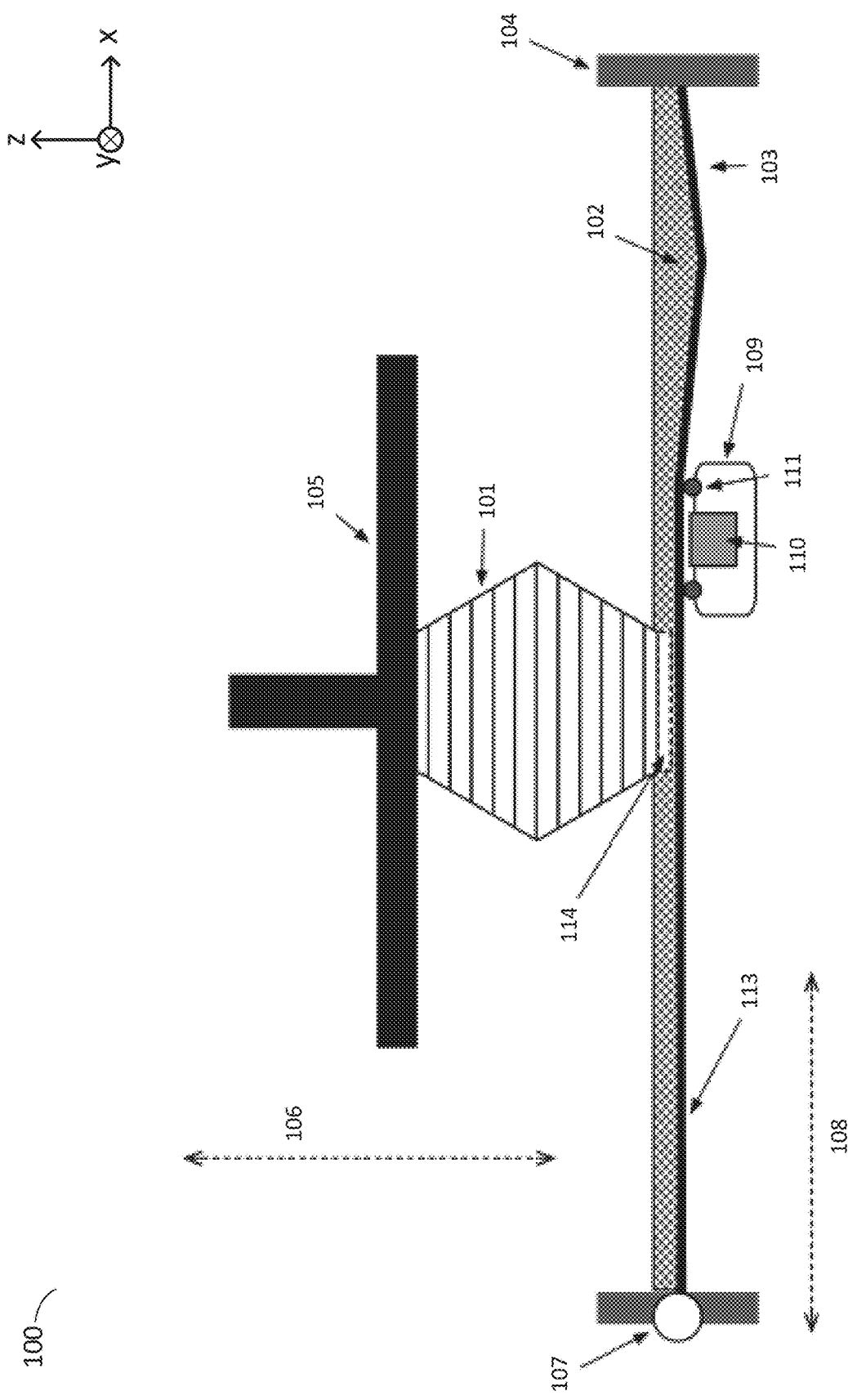

In the example of FIG. 1B, optics module 109 has been moved along the bottom plane of the container 104 through axis 108. During this motion, roller elements 111 may press upwards against film 103 in order to flatten any deflection in the film and ensure that the film forms a substantially flat plane between the roller elements in contact with the film. Also during the motion, an exposure source 110 may be activated in order to cause actinic radiation 115 to be selectively emitted at various points along the Y axis. Actinic radiation 115 emitted by the exposure source 110 may be transmitted through the film 103 and irradiate a layer of photopolymer resin 102 located between the film and the lower surface of the part 101. When exposed to the actinic radiation 115, the exposed portion of the photopolymer resin 102 may undergo various reactions, such as polymerization, causing the flowable resin 102 to solidify or otherwise adhere to the previously formed layer of the part 101, forming a new layer 114 of the part 101. As shown in the example of FIG. 1C, the optics module 109 may continue to move along the X axis while selectively exposing regions along the Y axis using the exposure source 110. Accordingly, any desired region within the X-Y plane of the bottom of the container 104 may be selectively exposed to actinic radiation, causing polymerization of a new layer 114 of the part 101 in the desired shape.

Following exposure, the newly formed layer 114 may be in contact with both a previously formed layer and the film 103. While adhesion is desirable between the newly formed layer 114 and the prior layers of the part 101, unwanted adhesion may also be formed between the newly formed layer 114 and the film 103. As discussed above, to separate a layer from the film 103, some relative motion of the build platform and the container is produced by operating one or more actuators to move the build platform and/or move the container. During this process, the film 103 may deform until the adhesive forces are overcome and the layer separates from the film. The amount of force necessary to overcome the adhesive forces and initiate a peel of the film away from the layer is sometimes referred to as the "peel force."

"Separation" of a part from a surface, as used herein, refers to the removal of adhesive forces between the part and the surface (i.e. the surface of a container, the surface of a supporting liquid, etc.). It may therefore be appreciated that, as used herein, a part and a surface may be separated via the techniques described herein, though immediately subsequent to the separation may still be in contact with one another (e.g., at an edge and/or corner) so long as they are no longer adhered to one another. For instance, relative motion between a newly formed layer of material and the surface of a container may overcome chemical and mechanical adhesive forces between the liquid photopolymer and the cured photopolymer, yet the layer may still be in physical contact with the container once the adhesion has been overcome. Moreover, adhesive forces between the part and the surface may include mechanical forces (e.g., the absence of liquid between the part and surface inhibiting separation) and/or chemical adhesive forces.

Figure 1D:
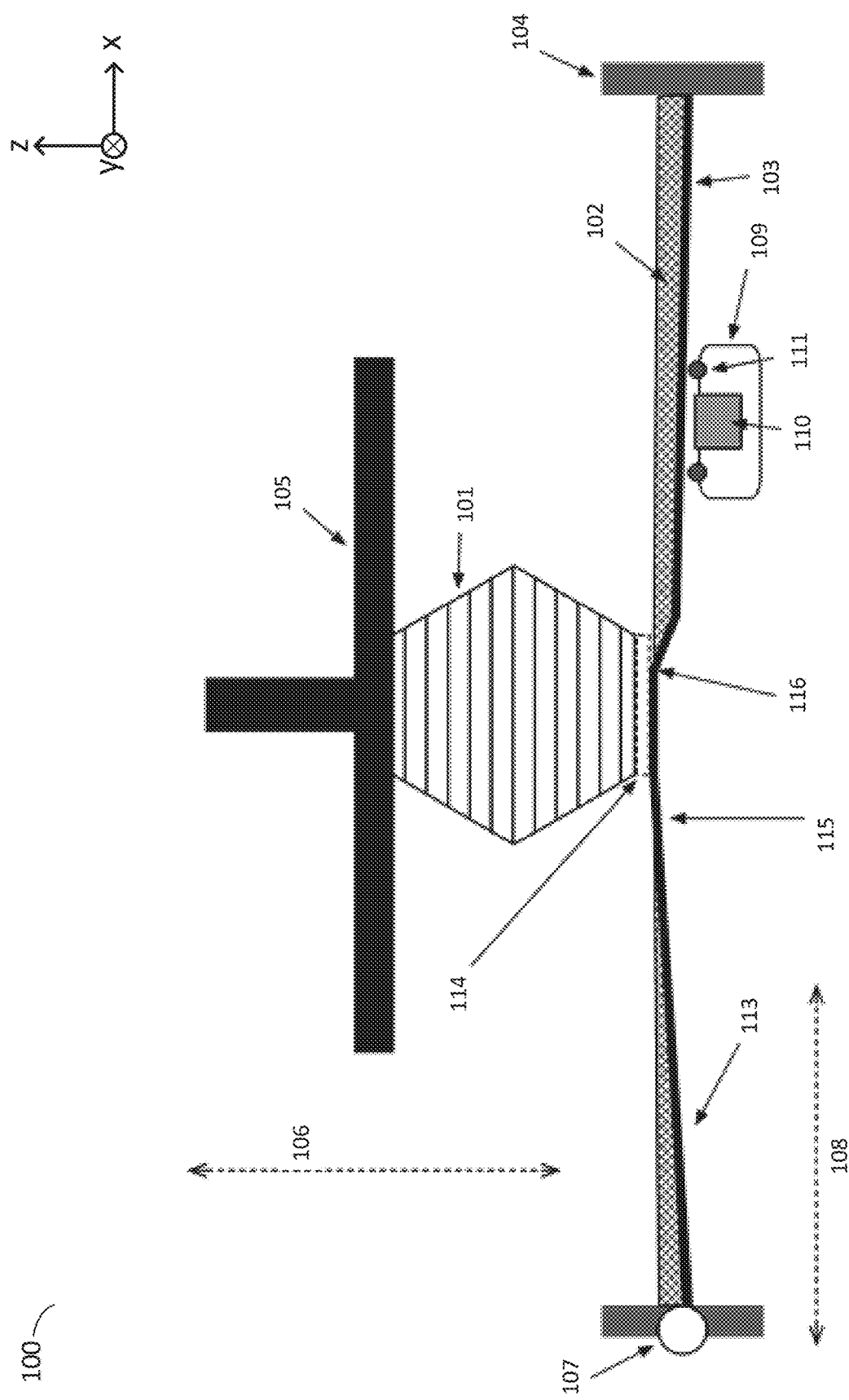

As shown in the example of FIG. 1D, one way of performing separation in illustrative stereolithographic device 100 is to lift the part 101, and thus newly formed layer 114, along axis 106, away from the film 103. Adhesive forces between the newly formed layer 114 and the film 103 may cause the film to deflect upwards 115 as the build platform 105 is moved away. Using a flexible, thin film as at least part of the floor of the container may allow a peeling edge to propagate inward from most or all of the outer edge of the contact area between the part 101 and the film 103. In particular, at a critical level of deflection, at least one portion of the film 103 may begin to separate, or peel, away from the newly formed layer 114, thus forming a peeling edge 116 which propagates across the interfacing surface of the film 103 and newly-formed layer 114. Separation of this manner may apply considerably less force to the part 101 compared with separation of a part from a rigid container having a release coating, as discussed above.

Following separation pictured in FIG. 1D, a new layer of the part 101 may be formed by returning to the configuration shown in FIG. 1A. In some embodiments, this may comprise returning the optics module 109 to its original position (as in FIG. 1A) without forming additional solid material. In other embodiments, however, the direction of the optics module 109 along axis 108 may be reversed, such that the formation process depicted in FIGS. 1A-1D occurs with the optics module 109 moving in the opposite direction.

In order to fabricate parts accurately, the exposure source 110 of optics module 109 must be calibrated so that it directs light to desired locations within the build area of the device 100 (that is, the area of the container in the X-Y plane in which solid material may be formed). In the case of the exposure source 110 comprising a laser and a mirror galvanometer, for example, calibration may comprise a relationship between galvanometer angle and build area position, which may differ across the build area.

Despite the reduced peel forces afforded by the use of a thin film within a container as described above, several undesirable effects may nonetheless occur. First, films can be punctured, whether through user error or mechanical failure, which can lead to liquid photopolymer leaking into the additive fabrication device. In extreme cases, optical components, such an optical window, can be contaminated leading to a poor user experience. In other cases, the film may instead be damaged by scratching or nicking the surface, which may not cause a leak but may affect the manner in which the light passes through the container into the liquid photopolymer, thereby altering where the liquid is cured and reducing the quality of fabricated parts.

In some additive fabrication devices that utilize films, a secondary, lower film may be arranged beneath the upper film that is adjacent to the liquid photopolymer so that the mechanical components of the device generally contact the lower film, rather than the upper film that holds the liquid. While this approach may reduce the chances of damage to the upper film, in some cases the films may adhere to one another, or dirt or dust may become trapped between the films.

The inventors have recognized and appreciated techniques to mitigate the above-described challenges with additive fabrication devices that utilize a film. Broadly speaking, these techniques include: improvements to an additive fabrication device build platform to more evenly apply forces onto the film; techniques for inhibiting adhesion between a pair of films and for removing dirt or dust therein; techniques for detecting and/or mitigating the effects of scratches or dust on films; and techniques for detecting film punctures, detecting an imminent film puncture, and/or reducing the impact on the device when punctures occur. These techniques may be applied within any additive fabrication device that utilizes a film, and is not limited by the other components of the additive fabrication device. For instance, the techniques are not limited to the particular light exposure techniques nor use of a movable stage as shown in the example of FIGS. 1A-1D.

Figure 2:
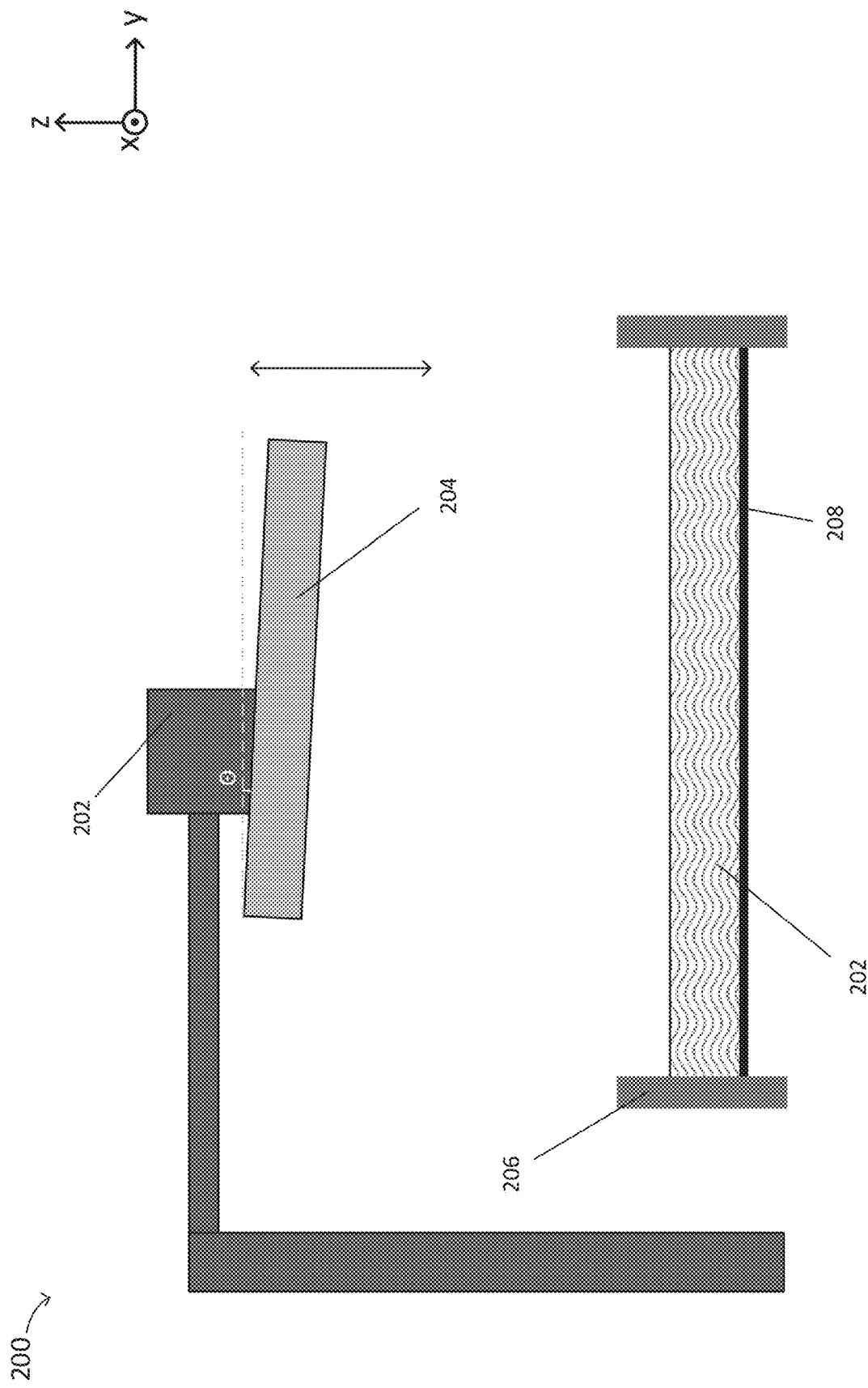
FIG. 2 illustrates a schematic view of a stereolithographic device in which a build platform is biased downward, according to some embodiments.

FIG. 2 illustrates a schematic view of a stereolithographic device in which a build platform is mounted with a downward bias, according to some embodiments. In the example of FIG. 2, stereolithographic device 200 includes a build platform 204, and a container 206 that holds a liquid photopolymer 202. The build platform 204 is mounted to a Z-stage 202, which is configured to raise and lower the build platform into and out of the container 206. In contrast to a conventional build platform Z-stage configuration, in the example of FIG. 2 the build platform is tilted toward the front of the container, or may be operable to tilt in that direction.

When a conventional build platform Z-stage is lowered into a container and pulls up on a newly-formed layer of material, the build platform can act like a cantilever because it is generally mounted to the Z-stage at the back of the device (on the left of FIG. 2). As a result, pulling up on the layer of material does not necessarily result in an evenly-applied force because the front of the build platform may be more compliant or otherwise more mobile than the back.

In the example of FIG. 2, the build platform 204 is tilted away from the mounted end of the build platform (away from the left side in the figure). According to some embodiments, the build platform may be fixed in this orientation. According to some embodiments, the build platform may be controllable (e.g., via one or more actuators coupled to the build platform) to be rotated from a horizontal orientation to the depicted rotated position and back as desired. According to some embodiments, the build platform may be hinged to allow a limited range of movement about an axis aligned in the x-direction. The build platform 204 may have an advantage that the required precision for assembly of the build platform is lowered compared with a build platform that is not tilted. While mounting arrangements that are different from that of FIG. 2 may be envisioned, any mounting configuration in which upward force on the platform causes it to rotate as well as translate will exhibit a greater degree of mobility along one axis more than another.

According to some embodiments, the build platform may be fixed at an angle or may be operable or free to rotate to an angle, of greater than or equal to 0.01°, 0.02°, 0.05°, 0.08°, 0.10°, 0.15°, 0.20°, or 0.25°. According to some embodiments, the build platform may be fixed at an angle or may be operable or free to rotate to an angle, of less than or equal to 0.25°, 0.20°, 0.15°, 0.10°, 0.08°, 0.05°, 0.02°, or 0.01°. Any suitable combinations of the above-referenced ranges are also possible (e.g., an angle of greater than or equal to 0.02° and less than or equal to 0.10°). The above-references angles refer to an angle θ shown in FIG. 2 between a horizontal plane (e.g., perpendicular to the Z-stage axis of motion, parallel to the surface of the container, etc.) and the surface of the build platform that contacts the container. As one example, a build platform that measures around 150 mm across its surface may be biased so that one end is around 0.1 mm lower than the opposing end, leading to an angle θ shown in FIG. 2 of around 0.05°.

Figure 3:
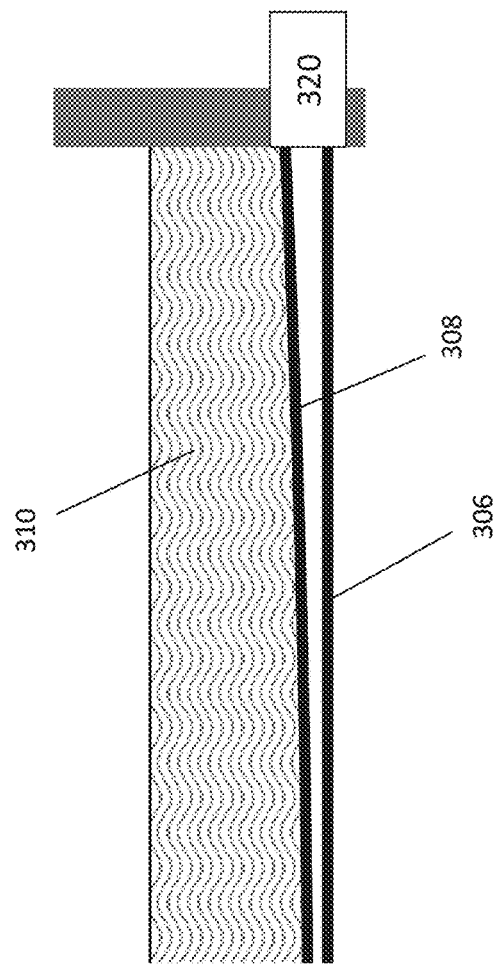
FIG. 3 depicts a portion of a container of a stereolithographic additive fabrication device that includes a dust control device, according to some embodiments.
Figure 4:
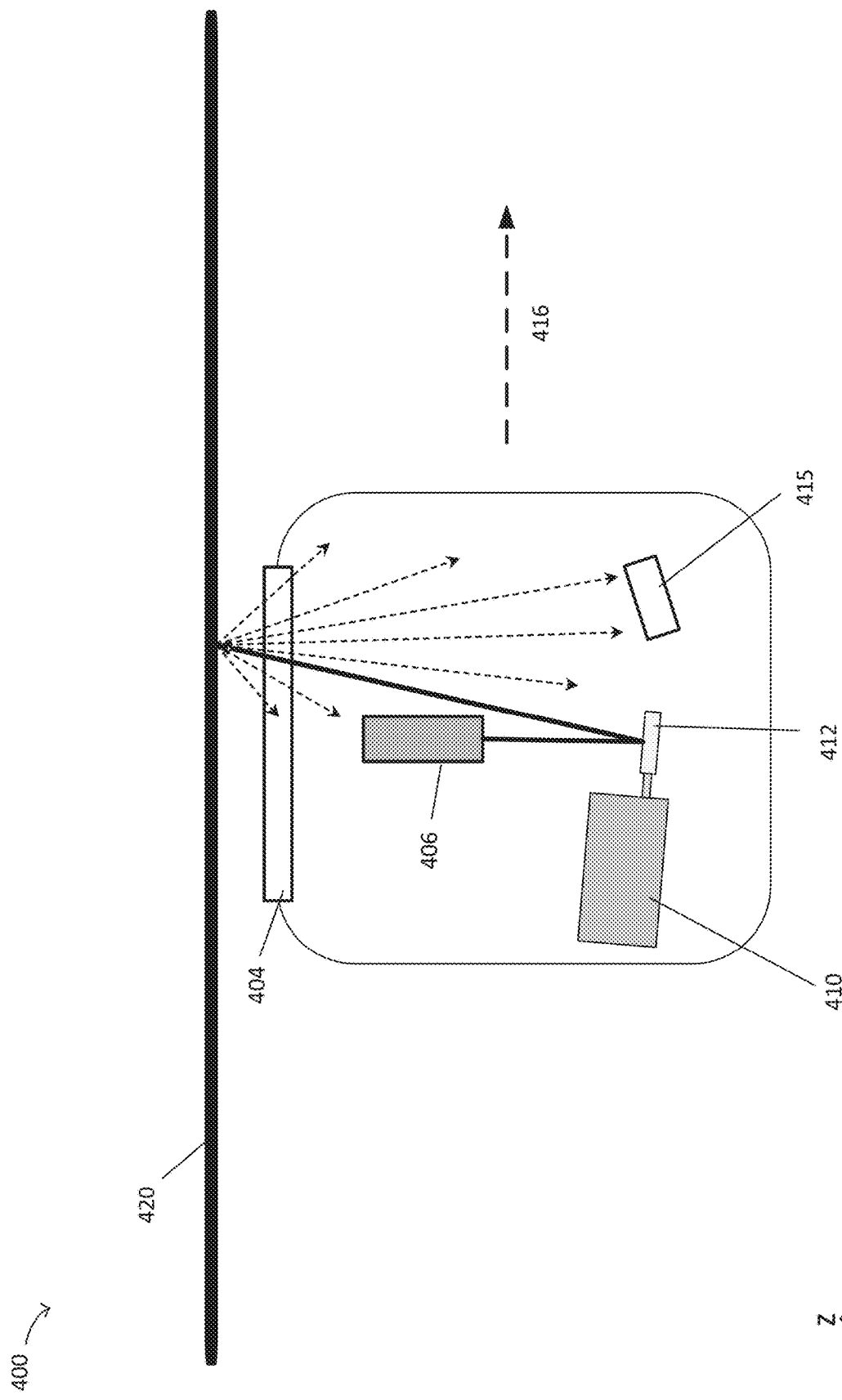
FIG. 4 depicts an illustrative approach to detecting contamination on the surface of a film in an additive fabrication device, according to some embodiments.

As noted above, in additive fabrication devices that include multiple films, in some cases the films may adhere to one another, or dirt or dust may become trapped between the films. FIGS. 3, 4 and 5 relate to techniques to mitigate these issues, as described further below.

FIG. 3 depicts a portion of a container of a stereolithographic additive fabrication device that includes a dust control device, according to some embodiments. In the example of FIG. 3, container 300 comprises films 306 and 308, which are extended across the bottom of the container. For clarity, only one side of the container is shown in the figure, and the container is shown holding a liquid photopolymer 310 for purposes of illustration.

In the example of FIG. 3, dust control device 320 is configured to prevent dust or other contaminants from entering the space between films 306 and 308 and/or is configured to remove dust or other contaminants from the space between films 306 and 308. "Control" as referred to herein may include removal of at least some of the contaminant from the surface of the film (not necessarily a complete removal of the contaminant from the container) and/or otherwise managing the amount of contaminants that enter the space between the films.

According to some embodiments, dust control device 320 may include one or more filters to prevent contaminants from entering the space between films 306 and 308 from outside of the container. For instance, dust control device 320 may include a fiberglass filter, a high efficiency particulate arrestance (HEPA) filter, a polyester filter, or combinations thereof.

According to some embodiments, dust control device 320 may include one or more mechanical vibrators configured to produce motion of film 306 and/or film 308 to remove contaminants from the surface of the film. For instance, dust control device 320 may comprise a piezoelectric vibrator may be coupled to either or both of films 306 and 308 and, when operated, may produce high frequency vibration of the film(s) to cause contaminants thereof to detach from the film(s).

Suitable actuators for producing vibration, which may also be referred to herein as mechanical vibrators, may include, but are not limited to, eccentric rotating mass (ERM) vibration motors; linear resonant actuators (LRA) such as rectangular LRAs; coin vibration motors such as LRA, brushless, or double-magnet brush type motors; cylindrical vibration motors, spring contact vibration motors, thru-hole vibration motors, encapsulated vibration motors, air-powered vibrators (e.g., a linear actuator in which a piston is actuated by aid along an axis, a rotary actuator in which air pushes a ball around in a chamber), or combinations thereof. An actuator for producing vibration (or mechanical vibrator) may produce vibration through any suitable technique(s), including via piezoelectric and/or magnetic techniques. Motion of an actuator for producing vibration (or mechanical vibrator) may include linear, rotary, angular and/or orbital motion.

According to some embodiments, dust control device 320 may include one or more sources of propelled gas, such as one or more fans or blowers, which may be operated to push contaminants off the surface of film 306 and/or film 308. For instance, dust control device 320 may comprise a positive-displacement blower or centrifugal blower arranged to direct air onto the surface of film 306 and/or film 308.

According to some embodiments, film 306 and/or film 308 may be configured to have a high permeability to oxygen and/or some other gas. In the case of film 308, this may inhibit curing at the surface of the film, leading to an easier separation of cured material from the film. Additionally, or alternatively, a high permeability to oxygen and/or some other gas for either or both films may allow the films to more easily separate from each other and allow gas to flow through the films.

In some embodiments, film 306 and/or film 308 may have an oxygen permeability of greater than or equal to 100 Barrer, 150 Barrer, 200 Barrer, 250 Barrer or 300 Barrer. In some embodiments, film 306 and/or film 308 may have an oxygen permeability of less than or equal to 800 Barrer, 750 Barrer, 600 Barrer or 400 Barrer. Any suitable combinations of the above-referenced ranges are also possible (e.g., an oxygen permeability of greater or equal to 300 Barrer and less than or equal to 600 Barrer, etc.).

FIG. 4 depicts an illustrative approach to detecting contamination on the surface of a film in an additive fabrication device, according to some embodiments. FIG. 4 shows system 400 including film 420 and a movable stage including the other components shown in the drawing: an optical component 410 (e.g., galvanometer), an optical component 412 (e.g., light reflecting mirror), a light source 406, an optical window 404, and a light sensor 415. The movable stage (e.g., including all of its components) is configured to move laterally (e.g., in the x-direction 416) below a curing plane (e.g., film 420 of the bottom of a resin container). In the example of FIG. 4, the light source 406 is arranged to direct light onto optical component 412, which may be, as a non-limiting example, a mirror. In some implementations the light source 410 may be configured to emit UV or near-UV light, and the film 420 is configured to be maximally transparent to the UV or near-UV light. The light is then directed towards the optical window 404 by the optical component 410 (e.g., galvanometer), and may pass through the optical window onto the film 420 (e.g., corresponding to the film 306 and/or 308 in FIG. 3).

Light incident upon the film 420 may be reflected back through the optical window 404, and light sensor 415 may receive at least some of the reflected light. In some examples, the light sensor 415 includes a complementary metal oxide semiconductor (CMOS) or a charge coupled device (CCD). Although FIG. 4 only shows one optical component 412 (e.g., mirror) and one optical component 410 (e.g., galvanometer), there could be multiple mirrors and galvanometers to reflect light in different axes (e.g., multi-axis galvanometer system).

In the example of FIG. 4, optical component 412 may direct light from the light source 410 to various positions within the print plane (e.g., on the film 420 and along the y-axis) by mechanical component 412, which may be a galvanometer according to some embodiments. The optical components such as optical window 404, light source 406, and light sensor 415 may be, as a group, moved in a direction along the x-axis 416 by a motor or other suitable actuator (not pictured). For instance, the optical components may be arranged within the movable stage 109 shown in FIGS. 1A-1D and described above. The light sensor 415 is strategically placed within the movable stage 109 to maximize the detection of reflected light. Additional lenses and/or mirrors to further control the light beam size, focus, and direction may be included in some embodiments. In this manner, light produced by the light source 406 may be scanned through a two-dimensional area.

Various types of contamination may potentially be present on the film 420. Generally, contamination may be expected to absorb incident light to some degree and/or to reflect or otherwise scatter light to some degree. In the discussion that follows, contamination that predominantly absorbs light (i.e., absorbs light more than scatters light) is referred to as "light absorbing" contamination. Similarly, contamination that predominantly scatters light (i.e., scatters light more than absorbs light) is referred to as "light scattering" contamination. Light absorbing contamination may, for instance, comprise any object that will not scatter the light back towards the detector (e.g., light sensor 415) such as comparatively large pieces of debris, hair, large pieces of dust, large particles, or combinations thereof. Light scattering contamination may, for instance, comprise any contamination that will scatter light back towards the detector (e.g., light sensor 415) such as photocurable materials, scratches, and smaller, more reflective dust particles, or combinations thereof. Notwithstanding the above nomenclature, it will be appreciated that light may be absorbed, or be scattered by, contamination to varying degrees and that the above terminology is provided for clarify of explanation and is not limiting with respect to the spectrum of light absorption and/or scattering that may be produced by contamination. It may also be appreciated that a single source of contamination may absorb or scatter light under different conditions, including, but not limited to, illumination with different wavelengths of light and/or being located at different distances from the light source 406.

As a result, non-contaminated regions on the film 420 and contaminated regions on the film will cause the light sensor 415 to detect reflected light with different profiles. For instance, the light sensor 415 may detect a comparatively lower average light intensity of $I_0$ when the light is directed to non-contaminated regions of the film 420, whereas when the light is directed to a region comprising light-scattering contaminants the light sensor detects a comparatively higher average light intensity of $I_1$. In contrast, when the light is directed to a region comprising light-absorbing contaminants, the light sensor may detect a comparatively lower average light intensity of $I_2$; that is to say, $I_2<I_0<I_1$. The location of the regions with contaminants on the film 420 can be calculated by recording the x position of the optical component 412 and its scanning angle when the reflected light intensity increases or decreases.

In the example of FIG. 4, when light scattering contamination is scanned, the contamination 410 may be detected by the light sensor 415 as a region which scatters light. As a result, contamination on the film may be detected. When a light absorbing contamination present on the film 420 is scanned, the contamination may be detected by the light sensor 415 as a region which does not scatter light. Contrast between light absorbing contamination on the film 420 and other regions of the film may be produced by arranging a light scattering surface above the film (e.g., the surface of the build platform). As such, when light absorbing contamination is not present on the film, the light may be expected to scatter onto the light sensor 415, whereas when such contamination is present it may be detected by the absence of light being scattered onto the light sensor. In some embodiments, light sensor 415 may comprise a notch filter to allow the system to distinguish between light scattered in the ordinary course of fabrication and light scattered from contamination.

In the example of FIG. 4, film 420 may represent either film within an additive fabrication device that includes multiple films in the container (e.g., film 308 or 306 of FIG. 3). In some embodiments, the optical components in FIG. 4 may be operated to detect contamination on either or both of such films. In some examples, the light source 410 is configured to produce light with different wavelengths, as different wavelengths can be used for contaminant detection on different films.

Figure 5A:
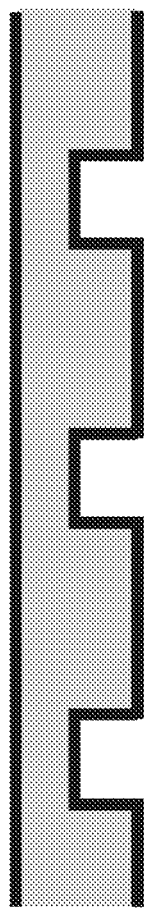
FIGS. 5A and 5B depict the surface of a film within a container of an additive fabrication device, according to some embodiments.
Figure 5B:
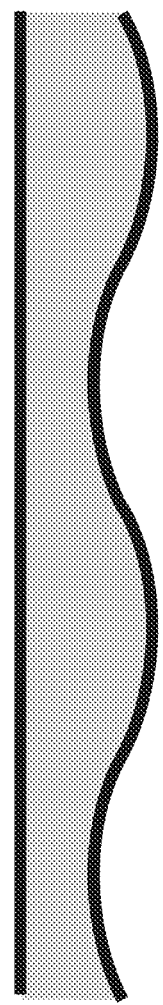

FIGS. 5A and 5B depict the surfaces of films within a container of an additive fabrication device, according to some embodiments. In the examples of FIGS. 5A and 5B, the lower geometry of the surface of a film has been arranged to be a non-flat (non-smooth) surface to inhibit the film from sticking to flat surfaces, such as another film. In the case of two smooth films, for example, the films may adhere to one another as a result of mechanical and/or chemical adhesive forces. When at least one film has a textured surface, however, such adhesion may be mitigated or avoided. The dimensions of the films are exaggerated in the drawing for purposes of illustration, with the edges of the films highlighted with black lines to show their profile. For example, film 510 and film 520 may represent the film 420 in FIG. 4, or either of films 308 or 306 in FIG. 3.

In the example of FIG. 5A, the film 510 has a textured lower surface that includes periodic steps in the surface. These steps, or gaps, may inhibit the above-referenced adhesion while providing a surface that has a normal direction that is the same everywhere as a flat surface. In other words, if light is always directed onto the film in a perpendicular direction, the light will not be refracted as a result of the non-flat surface (except possibly when light is incident on the edges of the steps). According to some embodiments, the steps may have a width that is between 10 μm and 100 μm. The steps may have a width along one direction that is different from their width along a perpendicular direction. For example, the steps may have a width of around 30 μm when measured across the horizontal direction in FIG. 5A, with a width of around 100 μm when measured into the plane of the page in FIG. 5A.

In the example of FIG. 5B, film 520 has a textured surface that includes an undulating surface with a large period. As with the film 510, the texture of this surface may inhibit adhesion while providing a surface that has a surface normal that is approximately the same everywhere as a flat surface. The size of the periodic surface oscillations in FIG. 5B are exaggerated for purposes of illustration—in practice the oscillations may be quite small to avoid significantly affecting the path of light being directed through the film. According to some embodiments, a period of the undulations of the film 520 may be between 500 μm and several mm. According to some embodiments, the height of the undulations may be approximately half the total thickness of the film 520.

Figure 6A:
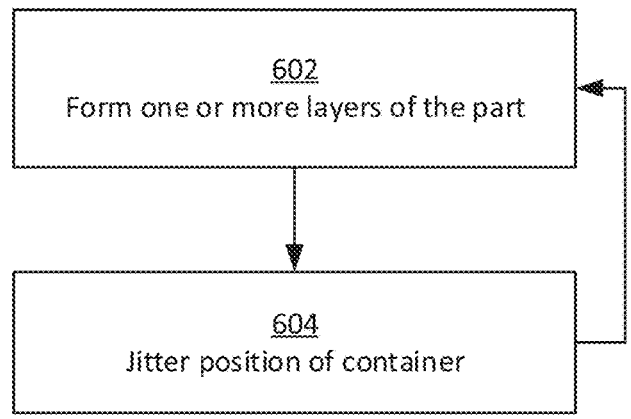
FIGS. 6A-6C illustrate a process by which additive fabrication may be performed while mitigating any scratches or contaminants present on a film, according to some embodiments.
Figure 6B:
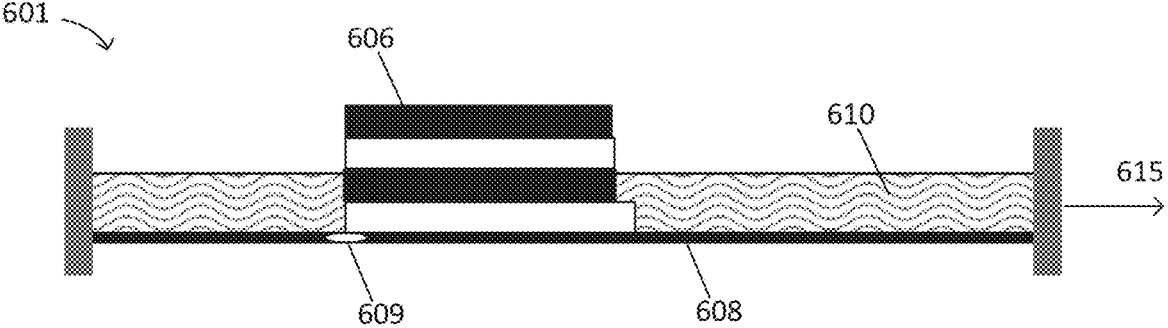
Figure 6C:
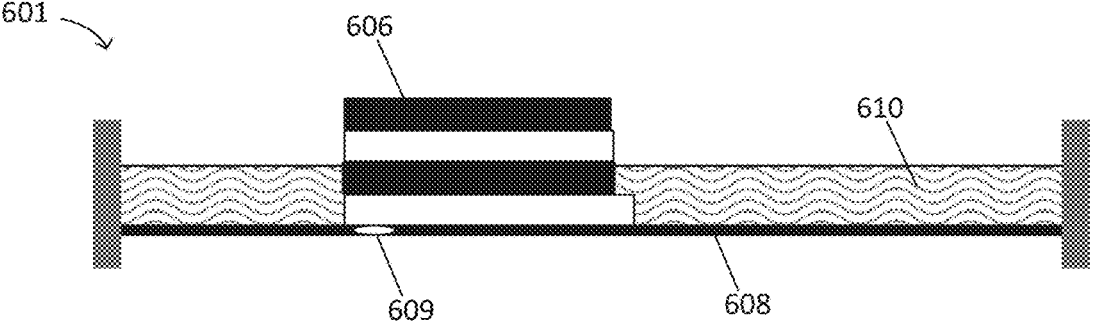

FIGS. 6A-6C illustrate a process by which additive fabrication may be performed while mitigating any scratches or contaminants present on a film, according to some embodiments. The inventors have recognized that while contaminants or damage to a film or other surface in a stereolithographic additive fabrication device may alter the path of light through the surface, by jittering the position of the surface the effects of such contaminants or damage may be reduced. For instance, in method 600, one or more layers of a part may initially be formed in act 602 as described above.

The container of the additive fabrication device may, however, have been damaged as shown in FIG. 6B, which depicts a scratch 609 (or a contaminant as described in FIG. 4) on the surface of a film 608. Due to the location of the scratch 609, the surface finish of the part 606 may be impacted because light passing through the film 608 into the liquid photopolymer 610 may pass through the scratch and may thereby cure a region of the liquid other than is intended.

To mitigate this issue, the container 601 may be moved along a direction 615 (in act 604 of method 600), thereby producing the arrangement shown in FIG. 6C. Since the light source and part 606 (and the build platform holding the part 606) remain stationary, when light is directed to the same location above the film, the light does not now pass through the scratch and the surface finish of the part may not be affected as much. The acts of method 600 may be repeated many times to jitter the container though two or more positions. That is to say, whenever light emitted from the light source is configured to pass through the scratch, the container is moved laterally (e.g., along the direction 615) to cause the light to pass through a different, non-scratched region before curing a layer of resin within the container. By repeatedly jittering the position of the container, the effect of any scratches or contaminants on the container upon the surface finish of a part may be reduced. In some embodiments, the method 600 is used after the determination of the location of the scratch 609, for example, by the process described in FIG. 4.

Figure 7C:
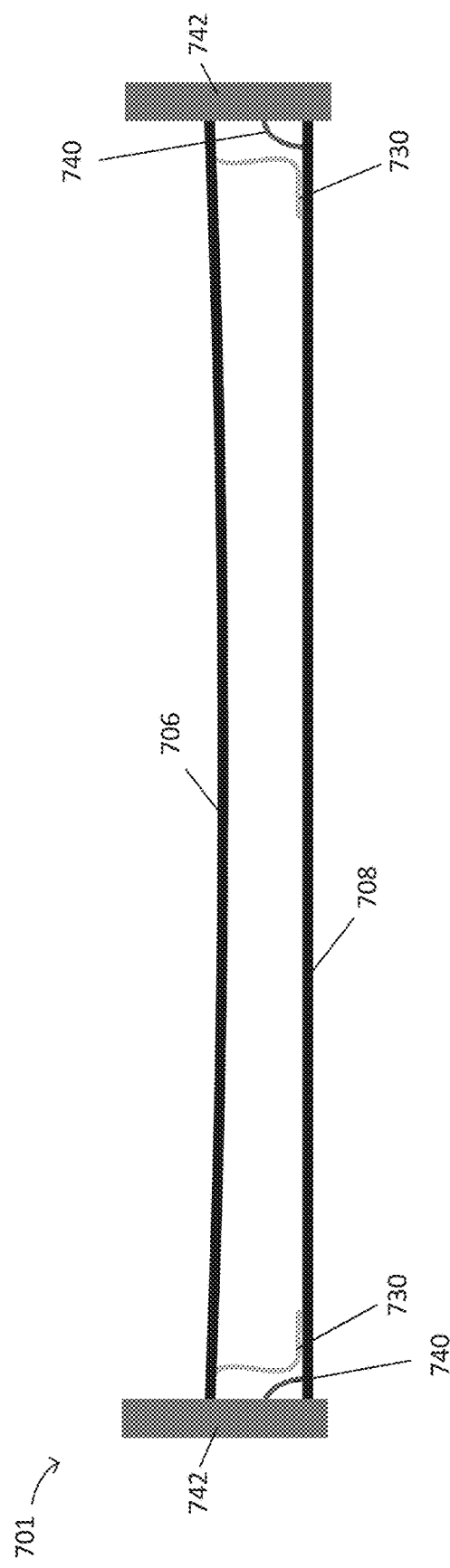
FIG. 7C depicts a container that includes a catch bag, according to some embodiments.

As noted above, films in an additive fabrication device can be punctured, which can lead to liquid photopolymer leaking into the additive fabrication device. FIGS. 7A-7C relate to an improved container design that reduces the effect that such an event may have on the device.

FIGS. 7A-7B depict a container of an additive fabrication device that includes two films and a skirt, according to some embodiments. FIG. 7A depicts a schematic cross-sectional view of the container, whereas FIG. 7B depicts a perspective view of the container that omits the upper film. In the example of FIGS. 7A-7B, the container 700 includes an upper film 706 and a lower film 708, which are both suspended between sides of the container. A skirt 730 is attached to the upper film 706 and hangs down to provide a contained space beneath the upper film. In some embodiments, the skirt 730 may be arranged in contact with the lower film 708 though appropriate tensioning of the film and/or the skirt. In some embodiments, the skirt 730 may operate as an example of the dust control device 320 shown in FIG. 3 in that the skirt may block dust from entering the space between films 706 and 708.

The skirt 730 may limit the extent to which liquid that leaks through the upper film 706 escapes from the container, as it may catch or stop the flow of the liquid to outside of the skirt. However, the liquid may nonetheless be able to escape.

FIG. 7C depicts an improved container 701 that includes a catch bag attached to the lower film 708 and to the sides of the container 742. The catch bag may extend around some or all of the perimeter of the lower film 708 to provide a barrier against liquid leaking over the sides of the lower film.

As an alternative to the catch bag pictures in FIG. 7C, the container may include a trough around the perimeter of the lower film 708, which may be attached to the sides of the container 742.

Irrespective of whether a container includes a skirt and/or a catch bag as described above, in some embodiments an additive fabrication device may be configured to detect a leak or spill of liquid photopolymer. For instance, the lower film 708 or some other component beneath the upper film 706 may be configured to detect contact with the liquid photopolymer. In some cases, the lower film 708 may be coated with an additive that changes color or otherwise visibly reacts when liquid photopolymer contacts the film. The additive fabrication device may be configured to detect this reaction via a light sensor or otherwise, and warn a user of the leak. In some embodiments, the liquid photopolymer may contain one or more reagents that react with the additive on the lower film or other component to produce the above behavior. In some cases, one or more light sources (e.g., the source of actinic radiation in the SLA device) may be directed onto the lower film to illuminate any liquid photopolymer that is present there for purposes of detection. This may combine with the other techniques above, e.g., an additive on the film may visibly react only when illuminated, or may visibly react to a greater extent when illuminated.

Figure 8:
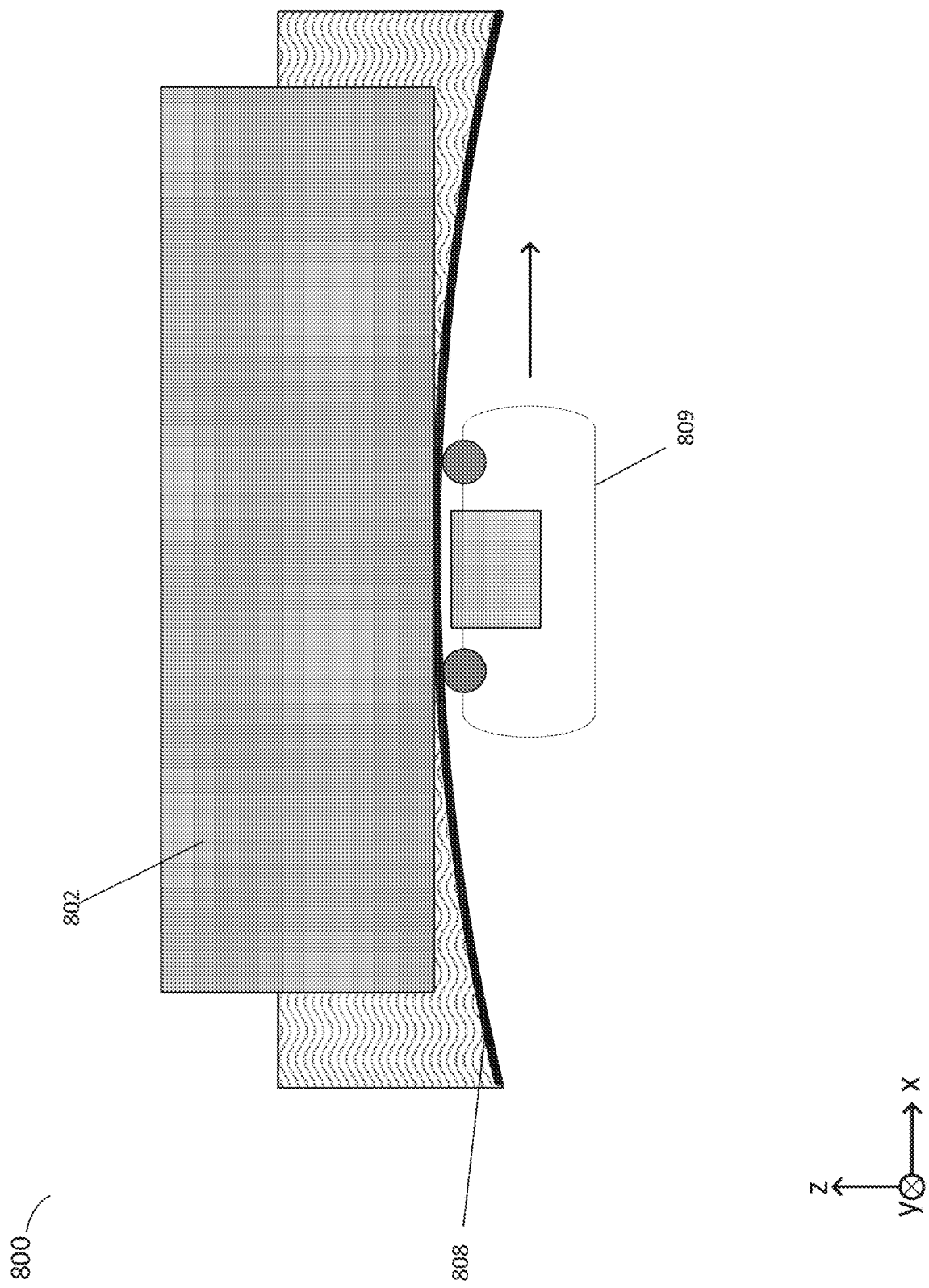
FIG. 8 depicts detection of damage to a container in an additive fabrication device that includes a film, according to some embodiments.

FIG. 8 depicts detection of damage to a container in an additive fabrication device that includes a film, according to some embodiments. The example of FIG. 8 depicts a process by which a film within a container can be examined to determine whether there is damage, such as tears or scratches, within the film.

According to some embodiments, a film may be examined as follows. The build platform of the additive fabrication device 802 may be lowered until it contacts the film 808, as shown in FIG. 8. Subsequently, a movable stage (e.g., stage 109 as shown in FIGS. 1A-1D) may be moved beneath the film and moved along the x-axis. Due to the loading of the build platform against the film, if the movable stage moves beneath a portion of the film that has been damaged, the force applied by the build platform along the z-direction may be expected to change. The build platform may be coupled to a z-force sensor that detects the z-force while the movable stage moves along the x-direction, thereby detecting both the presence and location of damage to the film.

According to some embodiments, a z-force sensor may be configured to perform in-line force sensing within a linear motion system such as those described in U.S. application Ser. No. 16/427,959, titled "Techniques for Force Sensing in Additive Fabrication and Related Systems and Methods," filed on May 31, 2019, which is hereby incorporated by reference in its entirety.

Figure 9:
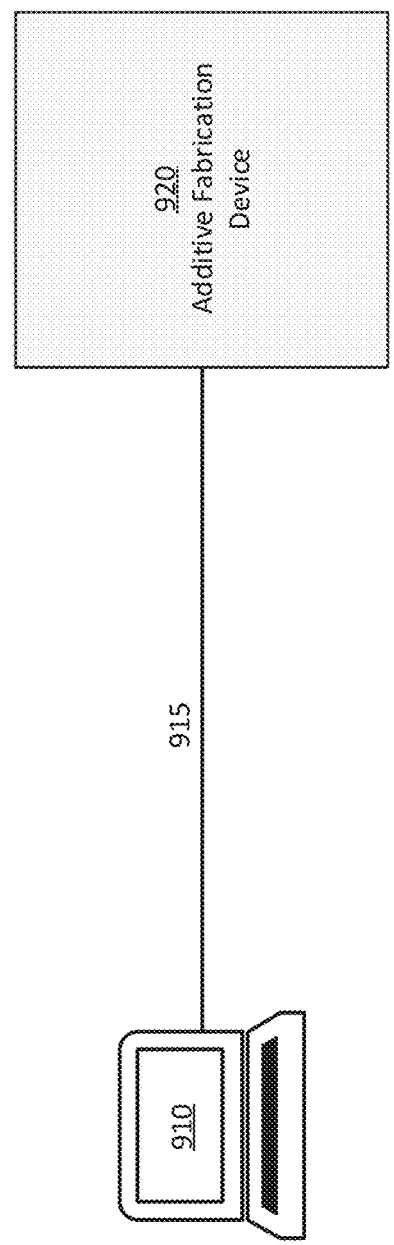
FIG. 9 is a block diagram of a system suitable for practicing aspects of the invention, according to some embodiments.

FIG. 9 is a block diagram of a system suitable for practicing aspects of the invention, according to some embodiments. System 900 illustrates a system suitable for generating instructions to perform additive fabrication by an additive fabrication device and subsequent operation of the additive fabrication device to fabricate a part. For instance, instructions to control an additive fabrication device to perform techniques described herein (e.g., operate dust control device 320, operate device 400 to detect contaminants on a film as shown and described in relation to FIG. 4, perform method 600 shown in FIG. 6A, operate device 800 to detect damage to a film, etc.) may be generated by the system and provided to the additive fabrication device. Various parameters associated with these techniques may be stored by system computer system 910 and accessed when generating instructions for the additive fabrication device 920. It will be appreciated that any of the above-described techniques may be combined in any suitable manner and in any suitable order.

According to some embodiments, computer system 910 may execute software that generates instructions for fabricating a part using additive fabrication device. Said instructions may then be provided to an additive fabrication device, such as additive fabrication device 920, via link 915, which may comprise any suitable wired and/or wireless communications connection. In some embodiments, a single housing holds the computing device 910 and additive fabrication device 920 such that the link 915 is an internal link connecting two modules within the housing of system 900.

Figure 10:
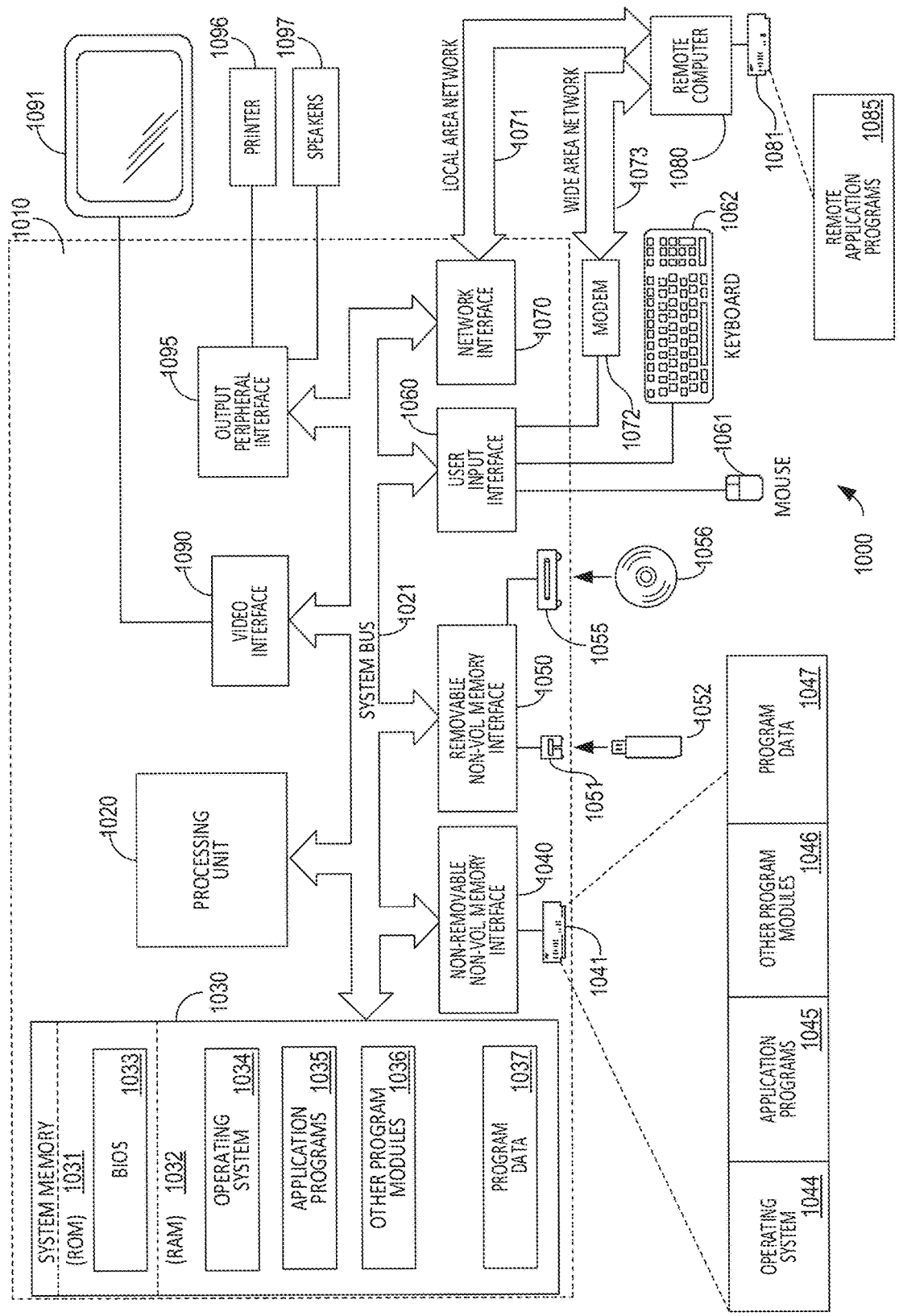
FIG. 10 illustrates an example of a computing system environment on which aspects of the invention may be implemented.

FIG. 10 illustrates an example of a suitable computing system environment 1000 on which the technology described herein may be implemented. For example, computing environment 1000 may form some or all of the computer system 910 shown in FIG. 9. The computing system environment 1000 is only one example of a suitable computing environment and is not intended to suggest any limitation as to the scope of use or functionality of the technology described herein. Neither should the computing environment 1000 be interpreted as having any dependency or requirement relating to any one or combination of components illustrated in the exemplary operating environment 1000.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the technology described herein includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a flash drive 1051 that reads from or writes to a removable, nonvolatile memory 1052 such as flash memory, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embodied in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of detecting a contaminated region of a film in an additive fabrication device, the method comprising:
   emitting light from a light source included in a movable stage, wherein the movable stage is configured to move in a first direction with respect to the additive fabrication device;
   directing the emitted light by an optical scanning device included in the movable stage to a plurality of locations on a film of a liquid container, wherein the film corresponds to a curing plane for the additive fabrication device;
   detecting, by a light sensor, different intensities of light reflected from the film for each of the plurality of locations on the film;
   detecting one or more contaminants on the film by comparing the different intensities of the reflected light from the film;
   in response to detecting the one or more contaminants on the film, calculating respective locations of the one or more contaminants on the film; and
   moving the container relative to a build platform of the additive fabrication device during a layer curing process, said moving being based on the calculated location of at least one of the one or more contaminants on the film.

2. The method of claim 1, wherein directing the emitted light by the optical scanning device is performed in conjunction with moving the movable stage in the first direction.

3. The method of claim 1, wherein detecting the one or more contaminants on the film comprises measuring a first intensity of reflected light from a first region on the film that is lower or higher than a second intensity of reflected light from a second region on the film that is adjacent to the first region.

4. The method of claim 1, wherein the film is a bottom film and wherein the container includes a top film spaced apart from the bottom film.

5. The method of claim 4, wherein one or more dust control devices are installed between the top film and the bottom film to provide a contained space beneath the top film.

6. The method of claim 4, wherein the bottom film includes a textured surface.

7. The method of claim 1, comprising moving the container in response to determining that the at least one of the one or more contaminants on the film is aligned with a surface of a part being fabricated during the layer curing process.

8. An additive fabrication device, comprising:
a build platform;
a light processing unit configured to move in a first direction with respect to the additive fabrication device, the light processing unit including:
an optical scanning device,
a light source, and
a light sensor;
a container including a lower film, an upper film spaced apart from the lower film, and a skirt attached to the upper film that hangs down to provide a contained space between the upper film and lower film and to prevent contamination from entering the contained space; and
one or more processors configured to:
operate the light source to emit light;
operate the optical scanning device to direct the emitted light to a plurality of locations on the film;
operate the light sensor to detect different intensities of light reflected from the film for each of the plurality of locations on the film;
detect one or more contaminants on the film by comparing the different intensities of the reflected light from the film; and
in response to detecting the one or more contaminants on the film, calculate respective locations of the one or more contaminants on the film.

9. The additive fabrication device of claim 8, wherein detecting the one or more contaminants on the film comprises measuring a first intensity of reflected light from a first region on the film that is lower or higher than a second intensity of reflected light from a second region on the film that is adjacent to the first region.

10. The additive fabrication device of claim 8, wherein the lower film includes a textured surface.

11. The additive fabrication device of claim 8, wherein the one or more processors are further configured to, in response to calculating the respective locations of the one or more contaminants on the film, jitter a position of the container relative to the build platform during a layer curing process.

* * * * *